(12) United States Patent
Wu

(10) Patent No.: US 9,160,384 B2
(45) Date of Patent: Oct. 13, 2015

(54) FILTER HAVING SIGNAL DETECTION FUNCTION

(71) Applicant: HON HAI PRECISION INDUSTRY CO., LTD., New Taipei (TW)

(72) Inventor: Sung-Chin Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 109 days.

(21) Appl. No.: 14/106,972

(22) Filed: Dec. 16, 2013

(65) Prior Publication Data

US 2014/0187188 A1    Jul. 3, 2014

(30) Foreign Application Priority Data

Dec. 28, 2012    (CN) .................... 2012 2 0733309 U

(51) Int. Cl.
  *H04B 1/10* (2006.01)
  *H01P 1/205* (2006.01)
(52) U.S. Cl.
  CPC ............ *H04B 1/1027* (2013.01); *H01P 1/2053* (2013.01)
(58) Field of Classification Search
  CPC ..................................................... H04B 1/1027
  USPC ........................ 455/307, 213, 286, 299, 306
  See application file for complete search history.

(56) References Cited

U.S. PATENT DOCUMENTS

| 4,323,777 | A | * | 4/1982 | Baskins et al. | ........... 250/339.04 |
| 5,701,082 | A | * | 12/1997 | Rogers | ........................ 324/628 |
| 6,058,076 | A | * | 5/2000 | Komninos | .................... 367/135 |

* cited by examiner

*Primary Examiner* — Sanh Phu
(74) *Attorney, Agent, or Firm* — Novak Druce Connolly Bove + Quigg LLP

(57) ABSTRACT

A filter includes a base and a sidewall extending from the base. The base and the sidewall cooperatively define a cavity. The filter further includes a signal input unit, and a signal output unit having a signal output port. The signal output port is located on the sidewall and extends outside of the cavity. The signal output port is connected to a conductive post received within the cavity. The conductive post collects radio signals and outputs the collected radio signals via the signal output port. The signal output unit further includes a signal detection module. The signal detection module includes a coupling plate, a coupling signal output terminal, and a probe. The coupling plate is electrically connected to the probe. The probe is located adjacent to the conductive post to receive radio signals surrounding the conductive post and output the received radio signals via the coupling output terminal.

8 Claims, 5 Drawing Sheets

FILTER HAVING SIGNAL DETECTION FUNCTION

BACKGROUND

1. Technical Field

The disclosure generally relates to filters, and particularly to a filter having a signal detection function.

2. Description of Related Art

Filters are very important in radio communication systems. The filter has a signal input port and a signal output port. However, the filter cannot detect radio signals output from the signal output port to determine whether the output radio signals satisfy requirements. Therefore, there is room for improvement in the art.

BRIEF DESCRIPTION OF THE DRAWINGS

The accompanying drawings are included to provide a further understanding of the disclosure, and are incorporated in and constitute a part of this application. The drawings illustrate embodiments of the disclosure and, together with the description, serve to explain the principles of the disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The reference "a plurality of" means "at least two."

Figure 1:
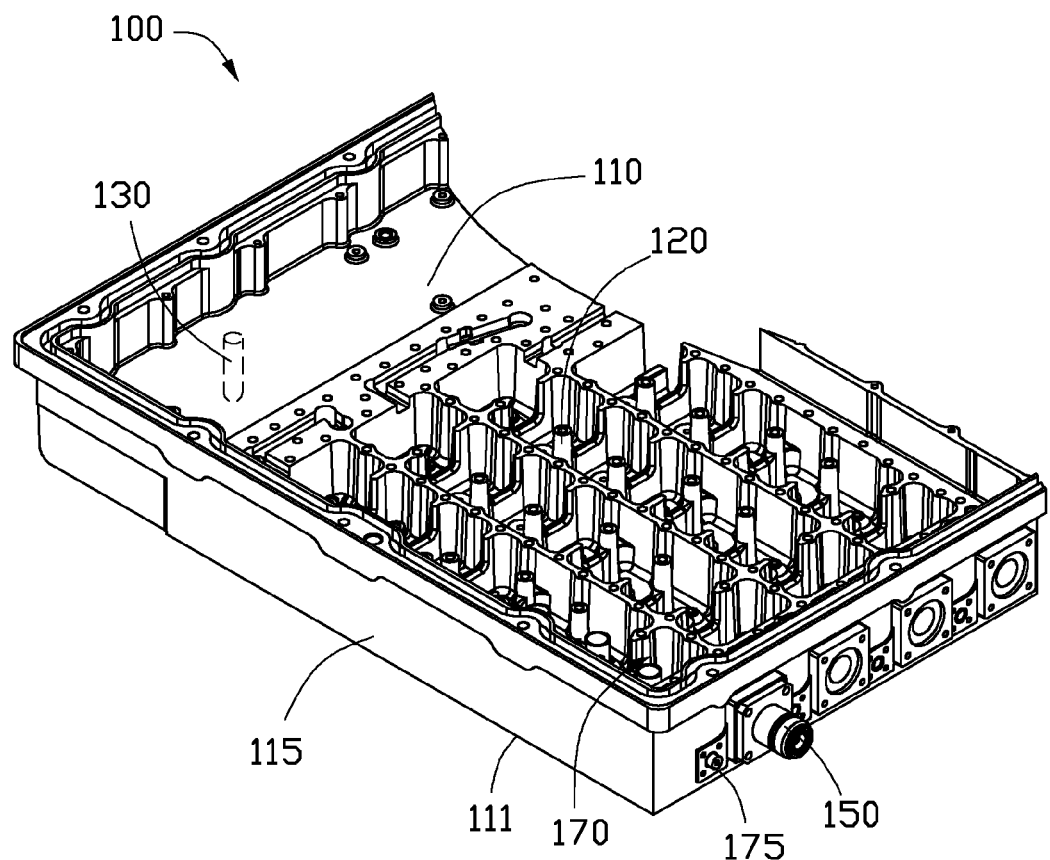
FIG. 1 is a schematic view of an embodiment of a filter.
Figure 2:
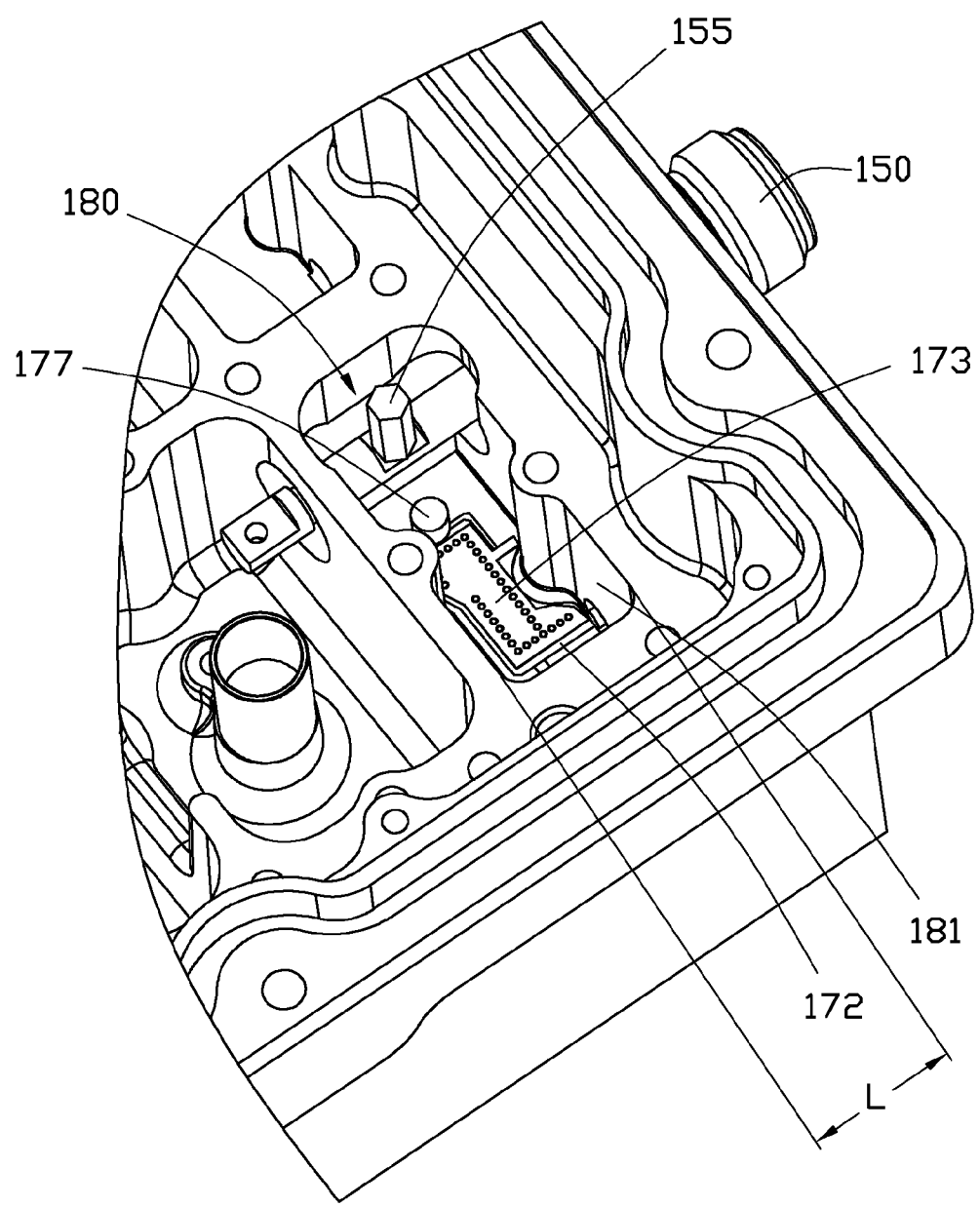
FIG. 2 is a partial enlarged view of the filter of FIG. 1.

Referring to FIG. 1 and FIG. 2, a filter 100 includes a cavity 110, a plurality of harmonic oscillators 120, a signal input unit 130, and a signal output unit 180. The plurality of harmonic oscillators 120 are arranged and accommodated in the cavity 110. The harmonic oscillators 120 are substantially columnar. The signal input unit 130 is arranged at a side of the cavity 110, and the signal output unit 180 is arranged at another side of the cavity 110 opposite to the signal input unit 130. The signal output unit 180 includes a signal output port 150 and a signal detection module 170.

The filter 100 further includes a base 111 and a sidewall 115 extending from the base 111. The base 111 and the sidewall 115 cooperatively define the cavity 110. In one embodiment, the signal input unit 130 is located on a bottom surface of the base 111 outside of the cavity 110, and the signal output port 150 is located on an outer surface of the sidewall 115 outside of the cavity 110.

The signal output unit 180 defines a receiving groove 181, and a conductive post 155 is received in the receiving groove 181. The signal output port 150 is electrically connected to the conductive post 155. The conductive post 155 is configured to collect radio signals from within the filter 100 and output the collected radio signals through the signal output port 150. In one embodiment, the receiving groove 181 is defined adjacent to the signal output port 150.

Figure 3:
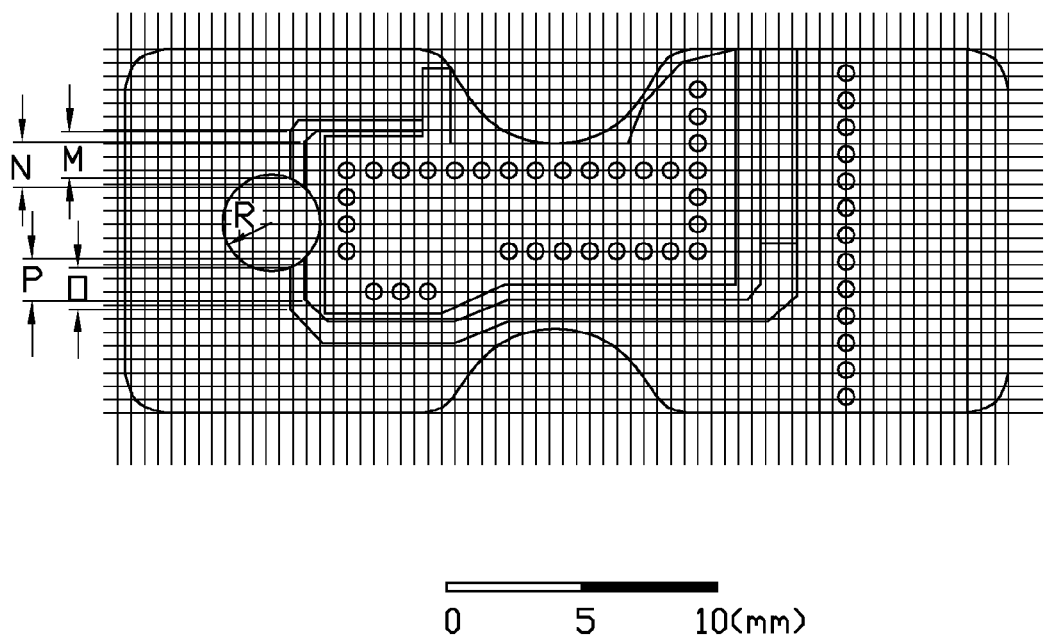
FIG. 3 illustrates a schematic view of dimensions of a coupling plate and a probe of FIG. 2.
Figure 5:
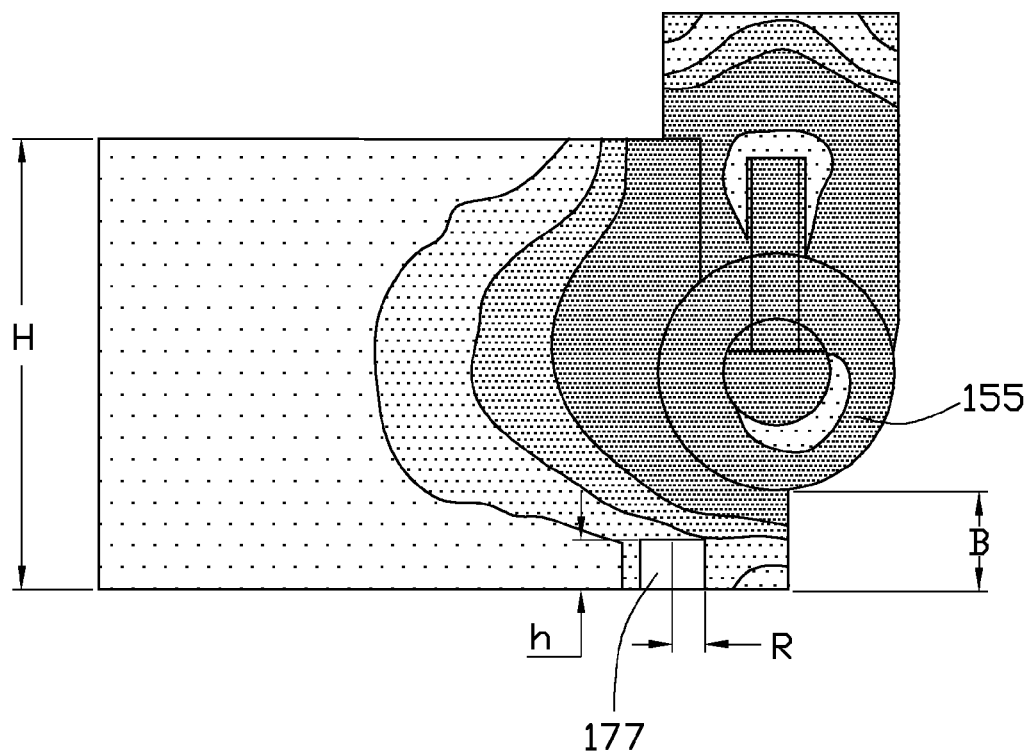
FIG. 5 shows a simulation view of an electromagnetic field distribution of the signal output unit of the filter with the probe arranged in the signal output unit.

The signal detection module 170 includes a coupling plate 173, a coupling signal output terminal 175, and a probe 177. In one embodiment, the coupling signal output terminal 175 is located on the outer surface of the sidewall 115 and adjacent to the signal output port 150. The coupling plate 173 is electrically connected to the probe 177. The coupling plate 173 and the probe 177 are both received in the receiving groove 181. The probe 177 is located adjacent to the conductive post 155 to receive radio signals surrounding the conductive post 155. The radio signals received by the probe 177 are then output via the coupling output terminal 175. The coupling plate 173 is electrically connected to the coupling signal output terminal 175. In one embodiment, the coupling signal output terminal 175 is located on the outer surface of the sidewall 115 outside of the cavity 110. In one embodiment, the probe 177 is a copper post protruding from the coupling plate 173. The probe 177 is electrically connected to the coupling signal output terminal 175 via a conductive line 172 of the coupling plate 173. Referring to FIG. 2, FIG. 3, and FIG. 5, specific dimensions of some components of the filter 100 are shown. In one embodiment, a radius R of a top surface and a bottom surface of the probe 177 is about 1.8 millimeters (mm), and a height h of the probe 177 is about 3.035 mm. A distance B between the conductive post 155 and the bottom surface of the base 111 is about 6.18 mm. A length L of the receiving groove 181 is about 15.15 mm, and a height H of the receiving groove 181 is about 23 mm. In FIG. 3, a length and width of each small pane of a grid represents about 0.5 mm.

Figure 4:
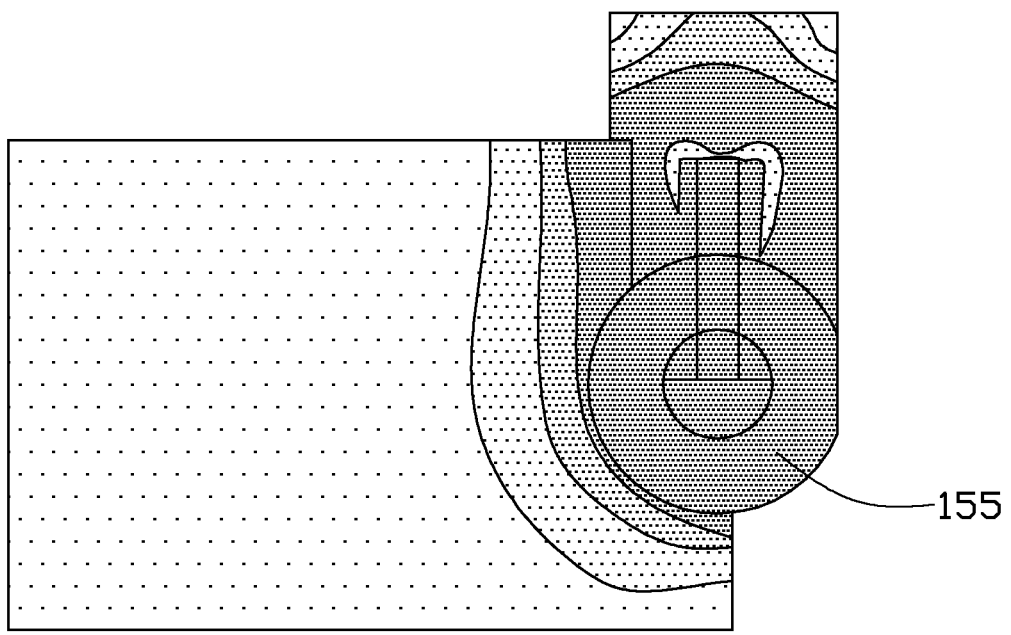
FIG. 4 shows a simulation view of an electromagnetic field distribution of a signal output unit of the filter without the probe arranged in the signal output unit.

FIG. 4 shows a simulation view of an electromagnetic field distribution of the signal output unit 180 without the probe 177. FIG. 4 shows that the electromagnetic field is distributed around the conductive post 155. FIG. 5 shows a simulation view of the electromagnetic field distribution of the signal output unit 180 with the probe 177. FIG. 5 shows that the electromagnetic field is distributed at the coupling plate 173 where the probe 177 is located.

The signal detection module 170 uses the probe 177 to detect radio signals near the signal output port 150 and outputs the detected radio signals via the coupling signal output terminal 175. Thus, the signal detection module 170 can determine whether the radio signals output from the filter 100 satisfy requirements by analyzing the output radio signals of the signal output unit 180 using tools such as an oscillograph.

Although numerous characteristics and advantages of the present embodiments have been set out in the foregoing description, together with details of the structures and functions of the embodiments, the disclosure is illustrative only; and changes may be made in detail, especially in the matters of shape, size and arrangement of parts within the principles of the disclosure to the full extent indicated by the broad general meaning of the terms in which the appended claims are expressed.

What is claimed is:

1. A filter, comprising:
    a signal input unit; and
    a signal output unit comprising a signal output port, a signal detection module, and a conductive post connected to the signal output, wherein the conductive post collects radio signals and outputs the collected radio signals via the signal output port, the signal detection module comprises a coupling plate, a coupling signal output terminal, and a probe, the coupling plate is electrically connected to the probe, and the probe is located adjacent to the conductive post to receive radio signals surrounding the conductive post and to output the received radio signals via the coupling signal output terminal.

2. The filter according to claim 1, further comprising a plurality of harmonic oscillators, a base, and a sidewall extending from the base, wherein the base and the sidewall cooperatively define a cavity, and the plurality of harmonic oscillators are accommodated within the cavity.

3. The filter according to claim 2, wherein the signal input unit is located on a bottom surface of the base outside of the cavity, and the coupling signal output terminal and the signal output port are located on an outer surface of the sidewall outside of the cavity.

4. The filter according to claim 1, wherein the probe is a copper post protruding from the coupling plate.

5. The filter according to claim 4, wherein a radius of a top surface and a bottom surface of the probe is about 1.8 mm and a height of the probe is about 3.035 mm.

6. The filter according to claim 2, wherein the signal output unit further comprises a receiving groove to receive the conductive post, the coupling plate, and the probe.

7. The filter according to claim 6, wherein a distance between the conductive post and a bottom surface of the base is about 6.18 mm, a length of the receiving groove is about 15.15 mm, and a height of the receiving groove is about 23 mm.

8. The filter according to claim 1, wherein the coupling plate comprises a conductive line, the probe is connected to the coupling signal output terminal via the conductive line.

\* \* \* \* \*